Aug. 21, 1962  A. J. FREEDMAN ET AL  3,049,915
SPECIMEN HOLDER FOR CONDUCTOMETRIC CORROSION MEASUREMENT
Filed July 2, 1959  4 Sheets-Sheet 2
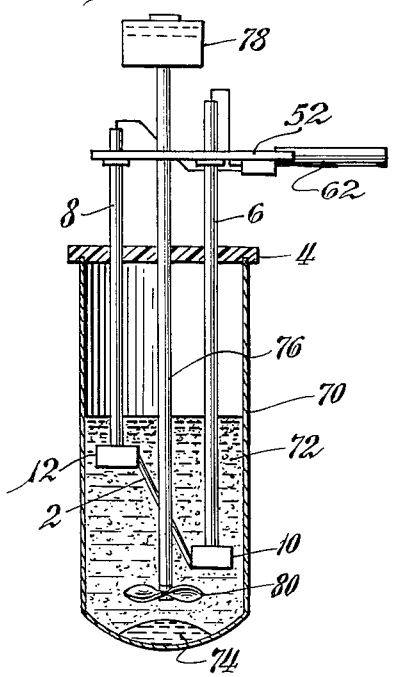
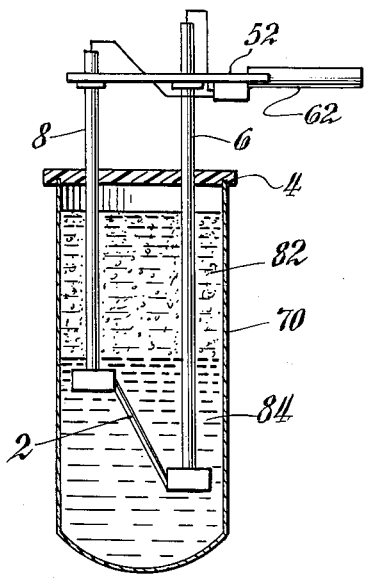
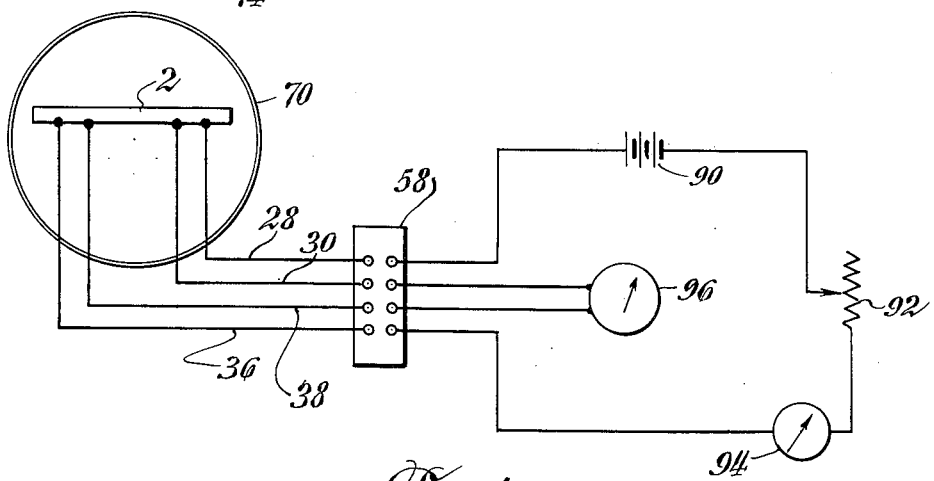
Inventors:
Arthur J. Freedman
George Reid
By Gerald Roe
Attorney

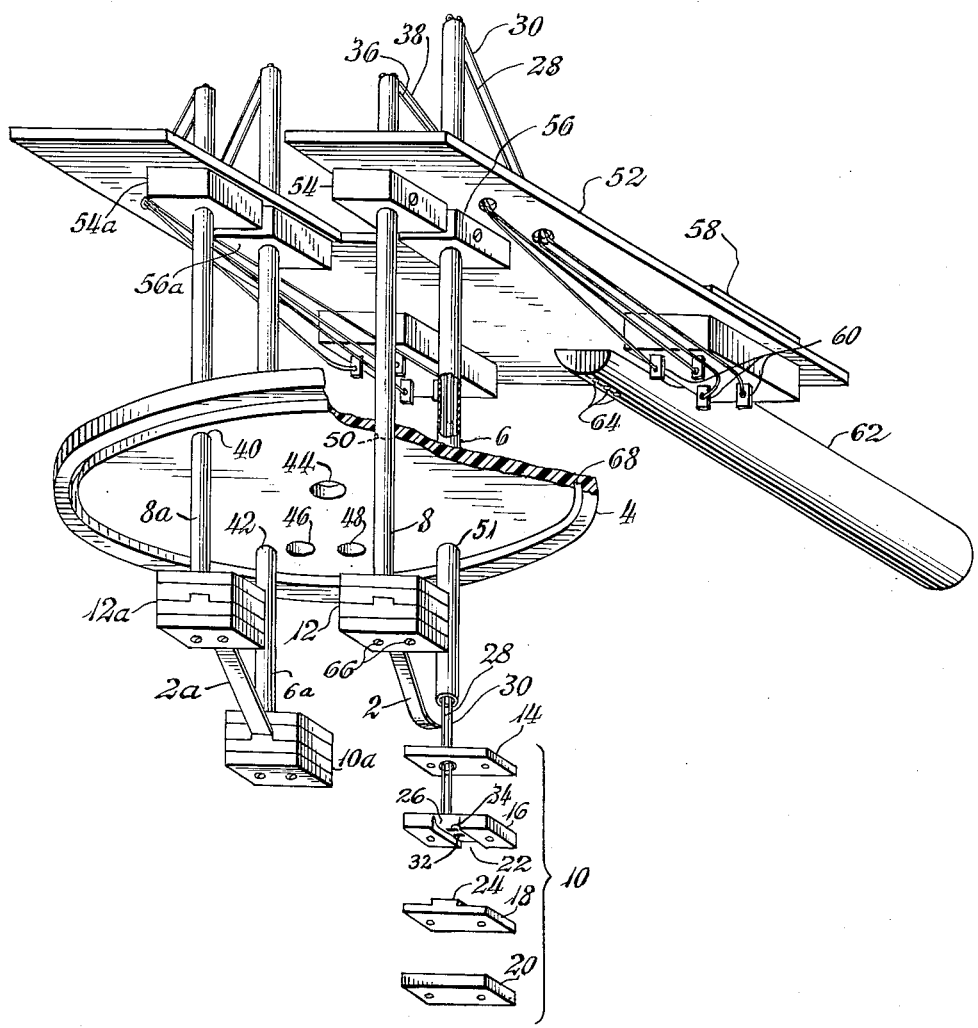

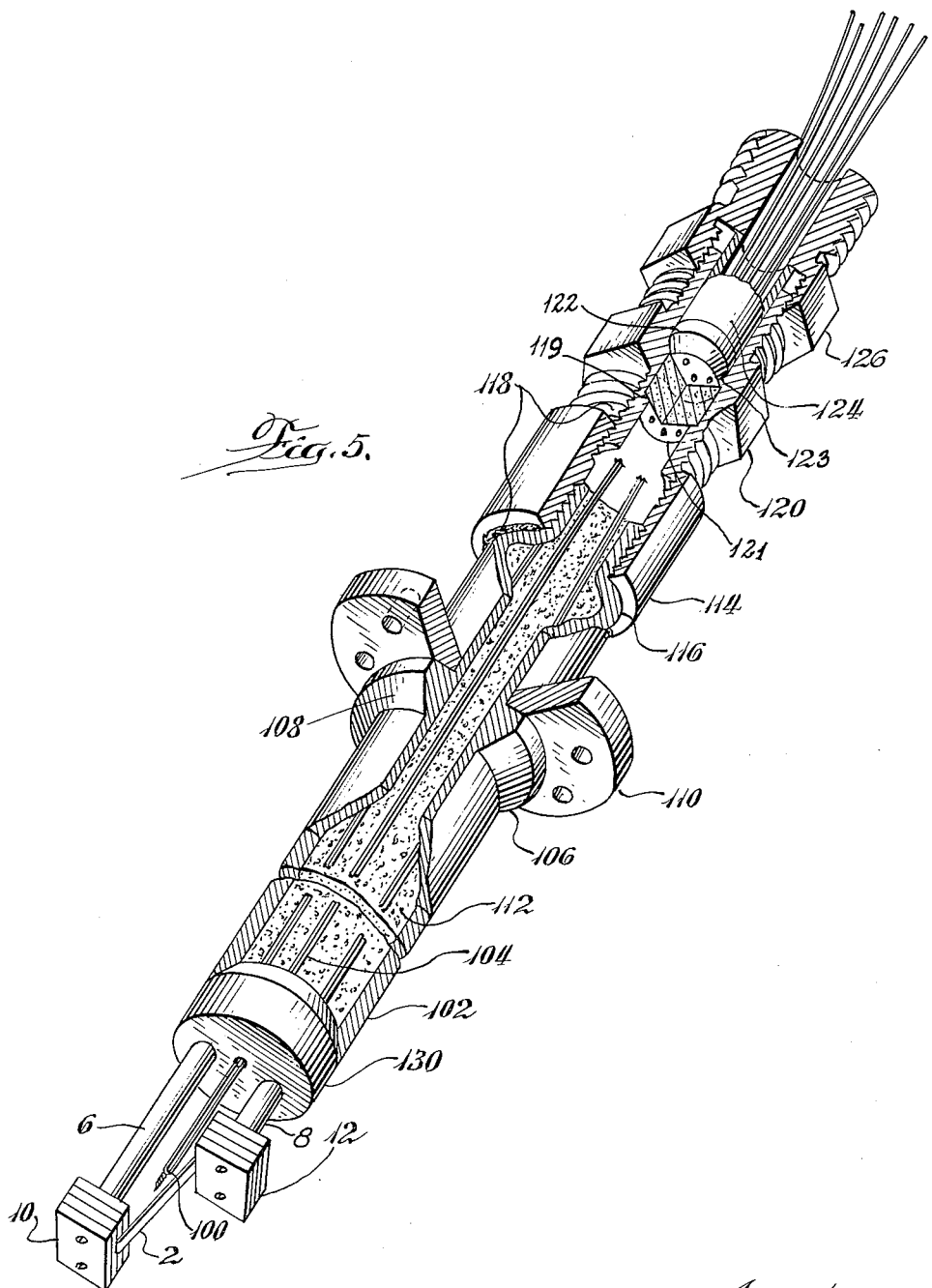

Aug. 21, 1962   A. J. FREEDMAN ET AL   3,049,915
SPECIMEN HOLDER FOR CONDUCTOMETRIC CORROSION MEASUREMENT
Filed July 2, 1959   4 Sheets-Sheet 4
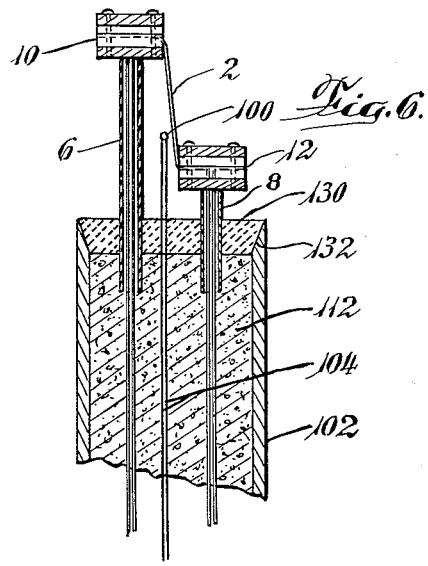
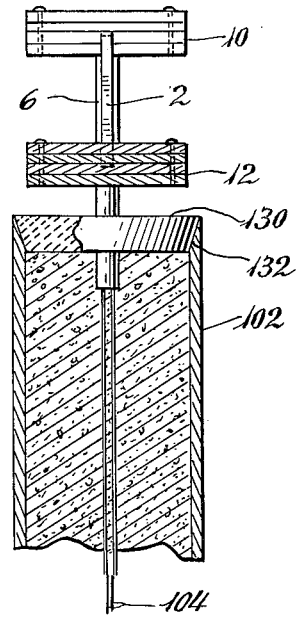
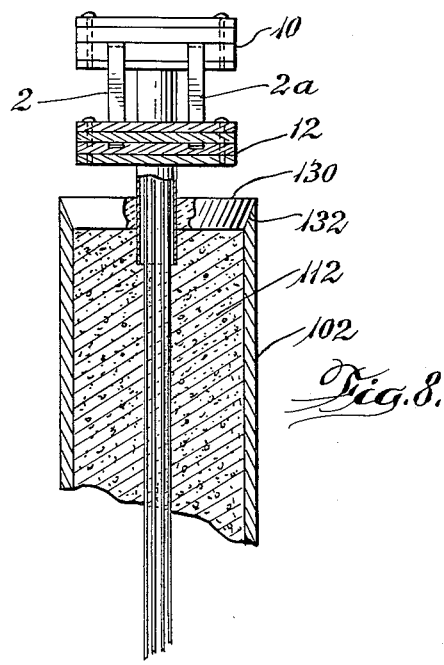
Inventors:
Arthur J. Freedman
George Reid
By Gerald Roe
Attorney United States Patent Office 3,049,915
Patented Aug. 21, 1962

3,049,915
SPECIMEN HOLDER FOR CONDUCTOMETRIC CORROSION MEASUREMENT
Arthur J. Freedman, Chicago Heights, Ill., and George Reid, Munster, Ind., assignors to Standard Oil Company, Chicago, Ill., a corporation of Indiana
Filed July 2, 1959, Ser. No. 824,651
3 Claims. (Cl. 73—86)

This invention relates to apparatus for measuring rates of corrosion and erosion. More particularly, it relates to an improved test probe construction which is characterized by utilizing replaceable corrosion test specimens for electrical measurement of corrosion and erosion rates.

In the ensuing specification, the terminology "corrosion" is employed to define any change in the thickness of a test specimen caused by corrosion, erosion, or the like. The description, however, will concern the phenomenon of chemical corrosion of a metal test specimen.

Heretofore, an electrical resistance system has been developed which directly determines the loss of metal from a test specimen exposed to corrosive substances within process equipment, pipelines and the like. According to this system, an expendable test specimen made of a corrodible metal is placed in the corrosive atmosphere. By electrically measuring the decrease in conductivity caused by a reduction in thickness of the specimen, the rate of corrosion of the specimen can be determined quickly and accurately. This rate of corrosion can be related to the rate of corrosion of the equipment itself. Likewise, the system may be used for evaluating the effectiveness of chemical corrosion inhibitors either in the laboratory or in service, and for evaluating the chemical resistance of different metals and alloys in corrosive environments. Corrosion rate determinations may be made automatically or manually, either intermittently or continuously, by measuring an electrical characteristic which depends on the resistance—or rather the change of resistance—of the specimen.

The foregoing conductometric corrosion test system has been widely adopted for both laboratory and industrial corrosion rate measurements. It is an object of the present invention to increase the versatility of such systems by providing an improved test probe assembly. A further object is to provide a probe assembly which employs a replaceable corrosion test specimen. An additional object is to provide a laboratory type conductometric corrosion test probe assembly for investigations of the effectiveness of corrosion inhibitors or of new alloys. Other and more particular objects will become apparent as the description of the instant invention proceeds in detail.

Briefly, in accordance with the invention, a corrosion test probe assembly is provided which features a pair of clamps having electrically insulating jaws to engage a corrosion test specimen. One or more electrical lead wires are arranged to terminate in one or more of the jaws so as to establish electrical connections to the specimen. The clamps are carried by tube-like members which extend from the base of the corrosion test probe and depend or protrude into a corrosive atmosphere; the lead wires pass via these tube-like members to the outside of the vessel or container which confines the corrosive atmosphere. The specimen is a thin strip of corrodible metal and a major feature of the invention is that this strip is replaceable. An important feature of the invention is that the jaws are so contoured as to avoid sharply bending the test specimen, which would otherwise tend to accelerate stress corrosion and crevice corrosion, and accordingly give non-representative corrosion rate measurements.

Additional details and advantages of the invention will become apparent from the ensuing description thereof read in conjunction with the drawings wherein:

FIGURE 1 shows an embodiment of the corrosion test probe assembly suitable for laboratory corrosion rate measurement studies;

FIGURE 2 shows schematically the apparatus of FIGURE 1 as employed in performing a dynamic conductometric corrosion test;

FIGURE 3 shows the apparatus of FIGURE 1 as it is used in conducting a static conductometric corrosion test;

FIGURE 4 is a simple electrical circuit used for measuring the resistance, and hence change in thickness due to corrosion, of a corrosion test specimen;

FIGURE 5 is an industrial model for a corrosion test probe embodying the principles of the instant invention;

FIGURE 6 is a plane view in section of the terminal portion of the industrial corrosion test probe shown in FIGURE 5;

FIGURE 7 is a front view in section of the probe assembly of FIGURES 5 and 6;

FIGURE 8 is an additional embodiment of a FIGURE 5-type probe assembly having two test specimens, one of which may be corrosion insensitive, for the purpose of providing a resistance measurement circuit having automatic compensation for change in resistance caused by temperature effects alone.

Turning now to FIGURE 1, the corrosion test probe assembly comprises a replaceable or expandable corrosion test specimen 2, one end of which is clamped between jaws 16 and 18 of clamp 10, the other end being secured in the same manner by clamp 12; container cover 4 through which pass clamp-carrying tubes 6 and 8; electrical lead wires 28, 30, 36 and 38; terminal and mounting plate 52; electrical connector 58; and handle 62.

Corrosion test specimen 2 is an elongated metallic corrodible electrical resistance element, usually referred to throughout this specification as the "corrosion test specimen." In FIGURE 1, corrosion test specimen 2 is a continuous metallic strip although in other embodiments, not shown, metallic tubes, wires, and etched, printed or painted circuits or the like may be used for corrosion measurements. Corrosion test specimen 2 is made of whatever metal the corrosion rate studies are to be made with, and metals such as steel, corresponding to the steels used in construction process equipment or pipelines, may readily be fabricated or obtained in such forms. A typical corrosion test specimen 2 may have the dimensions of about two inches long by one-eighth inch wide by one-thousandth inch thick, although the dimensions may vary in conformity with the desired characteristics of the test. A thinner test specimen exhibits a proportionally larger change in cross-sectional area for a given set of corrosive conditions relative to a thicker specimen.

Clamp 10 is employed to grip one end of corrosion test specimen 2 and is preferably fabricated of four plate-like sections, of which the outermost sections 14 and 20 are made of a corrosion-resistant material such as, for example, an alloy steel such as commercial "18-8" stainless steel. Between plates 14 and 20 are a pair of plates 16 and 18, which are made of a material which is both corrosion resistant and an electrical insulator. Since these plates are electrical insulators, the introduction of errors from galvanic effects between dissimilar metals is avoided entirely. Another function of plates 16 and 18 is to protect that part of corrosion specimen 2 which is enclosed between the plates from contacting the corrosive medium. This is necessary in order to avoid corrosion or fouling of the electrical contact points 32 and 34.

One or both of jaws 16 and 18 is made of a material which is sufficiently resilient to conform closely with the end of corrosion test specimen 2 when the latter is clamped tightly between the respective jaws. Suitable resilient materials are rubber-like materials such as neoprene rubber, or somewhat harder substances such as an organic resin, for example polyethylene, Teflon (polytetrafluoroethylene), Kel-F (polytrifluorochloroethylene) or the like. In one preferred embodiment, jaws 16 and 18 may both be made of Teflon, which is sufficiently resilient under clamping pressure to conform with corrosion test specimen 2.

The apparatus may be designed so that several different specimens, made from the same or different metals, can be tested simultaneously by providing a plurality of clamps 10 and 12, shown in the drawing as 10a and 12a.

When there is an offset or displacement in the longitudinal disposition of clamps 10 and 12, there tend to be two sharp bends in corrosion test specimen 2. These bends are undesirable as they give rise to accelerated corrosion due to stress corrosion cracking and crevice corrosion, and hence provide false corrosion rate measurements. To remedy this situation, jaw 16 is provided with a rounded contour 26 which eliminates such sharp bends. If desired, jaws 16 and 18 may be provided with a dovetail whereby jaw 16 is equipped with a recess or specimen-positioning slot 22 and jaw 18 may be provided with a corresponding mating projection 24.

Electrically conducting lead wires 28 and 30 provide electrical connection between corrosion test specimen 2 and the outside of the vessel away from the corrosive atmosphere region. Terminals 32 and 34, which are the ends of wires 28 and 30 respectively are desirably made of corrosion-resistant material, preferably one of the noble metals such as platinum. Terminals 32 and 34 consist of wires which are passed through small holes in jaw 16 and bent so as to be flush with the bottom of recess 22. The terminal wires 32 and 34 are extended a short distance (about ½ inch) into tube 6 and connected to wires 28 and 30, respectively, by silver soldering. The wires in tube 6 are insulated from each other by means of ceramic spacers, and the tube 6 is filled with a plotting compound such as Sauereisen cement 31 or 32 or an epoxy resin, to prevent the corrosive medium from entering the tube.

When assembled, the components of clamp 10 are secured tightly together by means of a pair of screws, not shown, passing through aligned holes in each of plates 20, 18 and 16 and terminating in tapped holes in plate 14. These screws are made of suitable corrosion-resistant material such as "18–8" stainless steel. Plate 14 is permanently secured to tube 6 by such means as welding or silver soldering.

In similar manner, clamp 12 and tube 8 are assembled, and, if desired, additional pairs of clamps and tubes 10a, 12a, 6a, and 8a may be provided for use with an additional corrosion test sample 2a. An embodiment including one additional pair of clamps and tubes is shown in FIGURE 1.

As further shown in the figure, the respective tubes 6, 8, 6a, and 8a pass through holes 51, 50, 42, and 40 of container cover 4. Container cover 4 may be of any suitable material such as a corrosion-resistant organic plastic exemplified by Teflon, for the purpose of excluding inadvertent contamination during corrosion test measurements and for containing the test atmosphere. Holes 44, 46 and 48 may, if desired, be included to accommodate such auxiliaries as a stirrer mechanism, inert gas bleeds or purges, or the like, which are omitted from the instant figure.

The tubes 6 and 8 are secured to plate 52 by means of suitable fittings 54, 56, 54a and 56a, which are in turn affixed to terminal and mounting plate 52. In the embodiment shown, fittings 54, 56, 54a and 56a are affixed to the underside of plate 52, and cover 4 is movable along tubes 6 and 8. (A recess 68 may be included in cover plate 4 to receive the top lip of a container which confines the corrosive material.) In an alternate embodiment, not shown, fittings 54, 56, 54a and 56a can be affixed to the top side of plate 52, and cover 4 can be affixed with screws to the underside of plate 52.

Turning now to FIGURE 2, the apparatus of FIGURE 1 is shown installed for conducting dynamic tests of corrosion inhibitors. Container 70 confines a body of oil 72 into which has been incorporated a corrosion inhibitor undergoing test, and a small amount of water 74 is also included. A stirrer mechanism such as a rotary stirrer, comprising electrical or air motor 78, shaft 76 and blade or propeller 80, is employed to violently agitate and mix the oil phase 72 and water phase 74 for the test. Corrosion occurring on test specimen 2 changes the resistance of the specimen. This resistance change is a measure of the corrosion occuring under the test conditions.

FIGURE 3 shows a similar arrangement but adapted for static corrosion test measurements. In this figure, corrosion test specimen 2 is immersed in the water phase 84, while oil 82 is present in a roughly equal volume above the level of specimen 2. The mixture of oil and water is stirred briefly before placing the probe in container 70 to distribute the inhibitor at equilibrium concentrations in both oil and water phases. After the two phases have separated, test specimen 2 is suspended in the oil phase 82 for a suitable period to permit it to absorb inhibitor, and then the assembly is lowered into the water phase where resistance change measurements are made.

FIGURE 4 shows a simplified embodiment of an electrical circuit for electrically measuring the thickness—actually resistance—change of a metallic corrosion test specimen 2. This simplified circuit is usable for corrosion rate measurements made at constant temperature. Specimen 2 is positioned, by means of a holder or probe assembly shown in FIGURE 1, into a corrosive atmosphere confined within vessel or container 70. Electrical connections are established between specimen 2 and the outside of container 70 and these preferably comprise two independent leads wires which are clasped to each end of specimen 2. As shown in FIGURE 4, these lead wires are identified as lines 28, 30, 36, and 38. Lines 28 and 36 are in an electrical circuit including a source of fixed potential such as battery 90, variable resistance 92 and an ammeter 94; since this circuit is used for establishing a flow of electrical current through specimen 2, lines 28 and 36 are herein termed "current leads." Lines 30 and 38, which similarly are connected to opposite ends of corrosion test specimen 2, are connected to a device for measuring the potential drop across specimen 2; these are the "potential leads." This potential-drop measuring device illustratively may be voltmeter 96. The current leads are disposed outside the potential leads.

Using this arrangement, any suitable current may be established by appropriate adjustment of resistance 92, and by taking readings of ammeter 94 and voltmeter 96, the resistance of corrosion specimen 2 may be determined at any instant. Methods of making such measurements are known, and are described, for example, in the patent to Andrew Dravnieks, U.S. 2,735,754. This patent also describes a method for using a second specimen which is, however, protected by suitable coatings so as to be insensitive to corrosion, for the purpose of correcting for the change of resistance of specimen 2 due the resistance change which occurs on changing the temperature thereof.

Turning now to FIGURE 5, an industrial corrosion probe embodying the inventive system and capable of withstanding elevated temperatures and pressures is shown. As may be seen readily from an inspection of FIGURE 5, the lower lefthand portion of the probe, i.e. that which is immersed in the corrosion atmosphere, comprises a pair of offset clamps 10 and 12, which are longitudinally as well as axially displaced to permit insertion through small diameter ports. Tubes 6 and 8 contain electrical lead wires and parallel the use of similarly identified tubes in FIGURE 1. An additional component is the thermocouple 100 which may be employed either for temperature measurements or in computations to correct for the temperature effect on the resistivity of corrosion test specimen 2.

A pressure resistant tubular member 102 comprises the basic construction of the probe assembly shown in FIGURE 5. Tubes 6 and 8 pass through a refractory corrosion resistant plug 130 of a material such as lava or ceramic porcelain into a potting compound 112 of, for example, epoxy resin or Sauereisen cement which prevents movement and electrical short circuiting between the several wires within the tube. If desired, one or more ceramic-type spacers may also be utilized to provide additional spacing and insulation of the lead and thermocouple wires. A built-up portion 106 of the tube is provided with sealing surfaces 108 for the purpose of mounting the corrosion test probe assembly in pressure tight relationship within the vessel in which the corrodant is retained. Surface 108 one one side of this built-up portion 106 is accurately machined in order to mate with corresponding portions on a flange of the vessel, not shown, to which it is secured by means of a flange 110 as shown in the figure. Alternately, a sealing surface of the screw type (not shown) may be substituted for the flange mounting.

The respective lead wires pass through the potting compound and any ceramic insulators, and are taken from the upper righthand end of the probe. In order to prevent the transmission of pressure along the lead wires, these wires pass through small apertures in a compressible plug 122 which may be made of powdered talc, or an organic plastic such as Teflon, rubber, or the like. This plug is compressed into sealing relationship with the wires by application of pressure from follower 124. Such pressure is applied by rotating the follower nut 126 along the threaded portion of the fixed nut 120. Pressure thus forces the plug 122 against tapered surface 123 of fixed nut 120 and against ceramic insulator 121 (which is held in position by shoulder 119).

Suitable welds 118 surround the nipple 114 so as to prevent transfer of pressure from the vessel to the space between the compressible plug and the potting compound.

FIGURE 6 is a cross sectional view of an elevation of the probe end shown in FIGURE 5. Tubes 6 and 8 are shown passing through plug 130 and embedded in potting compound 112. FIGURE 7 is a cross sectional front view of the same probe. FIGURE 8 shows a cross sectional view of a probe wherein the clamps 10 and 12 are adapted to receive a plurality of corrosion specimens 2 and 2a for simultaneously making measurements of the corrosion rates of two metals, or for utilizing one of the specimens (which is protected from corrosion) in a temperature compensation circuit.

From the foregoing presentation, it is clear that the objects of the present invention have been attained, and corrosion test probe assemblies are now available which utilize low cost, easily replaceable, expendable test specimens. Moreover, the probes are easily fabricated and may be thoroughly and conveniently dis-assembled for cleaning. Furthermore, the probes now make available an extremely low cost means for accurately conducting both laboratory and field corrosion test investigations.

We claim:

1. A laboratory conductometric corrosion test probe assembly comprising a container for confining a corrodant, a cover for said container, a pair of tubes depending from said cover and extending into said container, clamp means carried by each of said tubes, said clamp means being longitudinally disposed with respect to each other, said clamp means having electrically-insulating specimen-receiving jaws, at least one of said jaws being resilient, a corrosion test specimen insertable between said jaws, and wire means extending through each of said tubes and having terminals in said specimen-receiving jaws whereby to establish electrical connection to said corrosion test specimen.

2. A corrosion test probe assembly comprising a base member adapted to be attached through the wall of a container confining a corrosive atmosphere, a pair of tubes depending from said base member and extending into said atmosphere, clamp means carried by each of said tubes, said clamp means being axially disposed with respect to each other, electrically-insulating specimen-receiving jaws on each of said clamp means, at least one of said jaws being resilient, lead wire means extending through each of said tubes and terminating in said specimen-receiving jaws whereby to establish electrical connection between said corrosion test specimen and the outside of said container, and means for preventing pressure communication from said corrosive atmosphere to the outside of said container.

3. The corrosion test probe assembly of claim 2 wherein said means for preventing pressure communication comprises a compressible plug member through which the lead wire means pass.

References Cited in the file of this patent

UNITED STATES PATENTS

| | | |
|---|---|---|
| 2,396,836 | Ellinwood | Mar. 19, 1946 |
| 2,565,508 | Lomholt | Aug. 28, 1951 |
| 2,735,754 | Dravnieks | Feb. 21, 1956 |
| 2,864,252 | Schaschl | Dec. 16, 1958 |